United States Patent
Yen et al.

(10) Patent No.: US 7,310,294 B2
(45) Date of Patent: Dec. 18, 2007

(54) OPTICAL POWER CALIBRATION AT THE OUTER EDGE OF AN OPTICAL STORAGE CARRIER

(75) Inventors: Meng-Shin Yen, Taipei (TW); Wai William Wang, Taoyuan (TW); Tso-Tsai Chen, Taipei (TW)

(73) Assignee: Benq Corporation, Taoyuan (TW)

( * ) Notice: Subject to any disclaimer, the term of this patent is extended or adjusted under 35 U.S.C. 154(b) by 224 days.

(21) Appl. No.: 11/246,757

(22) Filed: Oct. 7, 2005

(65) Prior Publication Data

US 2006/0109763 A1    May 25, 2006

Related U.S. Application Data

(63) Continuation of application No. 10/050,627, filed on Jan. 16, 2002, now Pat. No. 6,990,051.

(30) Foreign Application Priority Data

Feb. 15, 2001    (TW) .............................. 90103479 A

(51) Int. Cl.
G11B 7/00    (2006.01)

(52) U.S. Cl. .................................. 369/47.53

(58) Field of Classification Search ................ 369/116, 369/275.3, 47.5, 47.51, 47.52, 47.53, 47.54
See application file for complete search history.

(56) References Cited

U.S. PATENT DOCUMENTS

| | | | |
|---|---|---|---|
| 4,631,713 A | 12/1986 | Romeas et al. | |
| 5,005,089 A | 4/1991 | Thanos et al. | |
| 5,070,495 A | 12/1991 | Bletscher, Jr. et al. | |
| 5,268,893 A | 12/1993 | Call et al. | |
| 5,305,296 A | 4/1994 | Kono | |
| 5,513,166 A | 4/1996 | Tokumitsu et al. | |
| 5,687,156 A | 11/1997 | Hurst, Jr. | |
| 5,818,807 A | 10/1998 | Kuroda et al. | |
| 6,028,834 A | 2/2000 | Kuroda et al. | |
| 6,052,347 A | 4/2000 | Miyata | |
| 6,067,284 A | 5/2000 | Ikeda et al. | |
| 6,078,559 A | 6/2000 | Takemura et al. | |
| 6,418,102 B1 * | 7/2002 | Suga ...................... | 369/47.53 |
| 6,459,666 B1 | 10/2002 | Yokoi | |
| 6,711,107 B2 | 3/2004 | Chao et al. | |
| 6,728,177 B2 | 4/2004 | Seong et al. | |

(Continued)

FOREIGN PATENT DOCUMENTS

JP    05-205342    8/1993

(Continued)

*Primary Examiner*—Nabil Hindi
(74) *Attorney, Agent, or Firm*—Snell & Wilmer L.L.P.

(57) ABSTRACT

A CD-R/RW drive (optical storage carrier player) includes an access device for writing data on a CD (optical storage carrier). The CD includes a central portion, an inner power calibration area which can provide the optical power calibration 100 times, a data storage area for data writing by a user and a last possible lead-out area, in order from CD center to CD outer edge. The method is to define an outer power calibration area in the last possible lead-out area to perform optical power calibration in this outer power calibration area such that the total number of optical power calibrations for the CD can exceed 100.

11 Claims, 3 Drawing Sheets

U.S. PATENT DOCUMENTS 6,795,381 B2   9/2004   Ando et al.
7,002,885 B2   2/2006   Wang et al.

FOREIGN PATENT DOCUMENTS

| | | |
|---|---|---|
| JP | 08-147701 | 11/1994 |
| JP | 09-28825 | 11/1997 |
| JP | 09-034561 | 11/1997 |
| JP | 10-293961 | 11/1998 |
| JP | 2000-099949 | 4/2000 |
| JP | 2000-235712 | 8/2000 |
| WO | WO 96/30902 | 10/1996 |

* cited by examiner

OPTICAL POWER CALIBRATION AT THE OUTER EDGE OF AN OPTICAL STORAGE CARRIER

CROSS-REFERENCE TO RELATED APPLICATIONS

This application is a Continuation of application Ser. No. 10/050,627, entitled OPTICAL POWER CALIBRATION AT THE OUTER EDGE OF AN OPTICAL STORAGE CARRIER, filed Jan. 16, 2002 now U.S. Pat. No. 6,990,051, which claims priority to Taiwan Application No. 090103 479, entitled OPTICAL POWER CALIBRATION AT THE OUTER EDGE OF AN OPTICAL STORAGE CARRIER, filed Feb. 15, 2001.

FIELD OF INVENTION

The present invention relates to a method of optical power calibration performed by the optical storage carrier player, such as the CD-R/RW drive, and more particularly, to a method of optical power calibration where calibration is performed at the outer edge of an optical storage carrier, such as a compact disc (CD).

BACKGROUND OF THE INVENTION

CD-R and CD-RW drives (optical storage carrier player) now are popular PC peripherals. In general, the CD-R/CD-RW drive performs an optical power calibration before actually writing data onto a compact disc (CD, optical storage carrier), such as: CD-R/CD-RW disc. The purpose of the optical power calibration is to determine a optimized writing optical power. Typical optical power calibration involves writing information to a power calibration area (PCA), which is located closed to the central portion of a CD disc. This information written on the power calibration area through the power calibration is read back, and the CD-R/CD-RW drive determines an optimized optical power from the signal reflected from the CD disc, and then the CD-R/CD-RW drive writes further data onto the CD disc by applying the optimized optical power.

Please refer to FIG. 1. FIG. 1 is a side view of a CD 10. The CD is a thin circular disk that is symmetrical about a centerline 11. The CD's specification is given in the Orange Book. The CD 10 comprises a central portion 12, a Power Calibration area (PCA) 14, located outside the central portion 12, a data storage area 16, located outside the PCA 14, and a last possible lead-out area 18, located near the CD outer edge.

Please refer to FIG. 2. FIG. 2 is a perspective view of the PCA 14 shown in FIG. 1. The PCA 14 comprises a test area 20 which allows a test data written thereon during the power calibration, and a count area 22 in which a count of the number of power calibrations already performed in the PCA 14 is recorded. According to the specification in the Orange Book, the test area 20 and the count area 22 are divided into 100 partitions 20a, 22a, respectively. Therefore, the optical power calibration can be performed up to 100 times.

However, after the CD disc is unloaded from the tray or the tray is moving out once, at least one optical power calibration is necessary to be performed for starting a new data writing action. According to the CD-disc standard described in the Orange Book, the 100 partitions available on the PCA limit the number of times available for writing to CD-R disc.

SUMMARY OF THE INVENTION

It is therefore a primary objective of the present invention to provide a method of optical power calibration in which calibration is performed at the outer edge of a CD, increasing the number of times optical power calibration can be performed.

According to the claimed invention, the method of optical power calibration comprises the following steps:

step 1: provide data to be written;

step 2: control the access device to perform an optical power calibration in the outer power calibration area;

step 3: according to an optical power calibration result, determine the writing optical power; and step 4: control the access device to write the information on the CD.

The claimed invention further provides a CD-R/RW drive. The drive has an access device for writing data on a CD. The CD comprises a central portion, an inner power calibration area, located outside the central portion, a data storage area, located outside the inner power calibration area, and an outer power calibration area, located outside the data storage area.

The claimed invention also further provides a control apparatus that controls a CD-R/RW drive. The control apparatus controls the access device to perform optical power calibration in the outer power calibration area to determine a optimized optical power, then writing information on the CD, according to the optimized optical power.

The claimed invention also provides a CD. The CD has a central portion, an inner power calibration area, located outside the central portion, a data storage area, located outside the inner power calibration area, and an outer power calibration area, located outside the data storage area. The outer power calibration area is used to perform an optical power calibration to determine an optimized optical power.

It is an advantage of the present invention that the calibration method with calibration in the outer edge of a CD can be performed in both the PCA and the last possible lead-out area, so that optical power calibration can be performed over 100 times.

These and other objectives of the present invention will no doubt become obvious to those of ordinary skill in the art after reading the following detailed description of the preferred embodiment which is illustrated in the various figures and drawings.

DETAILED DESCRIPTION

Figure 1:
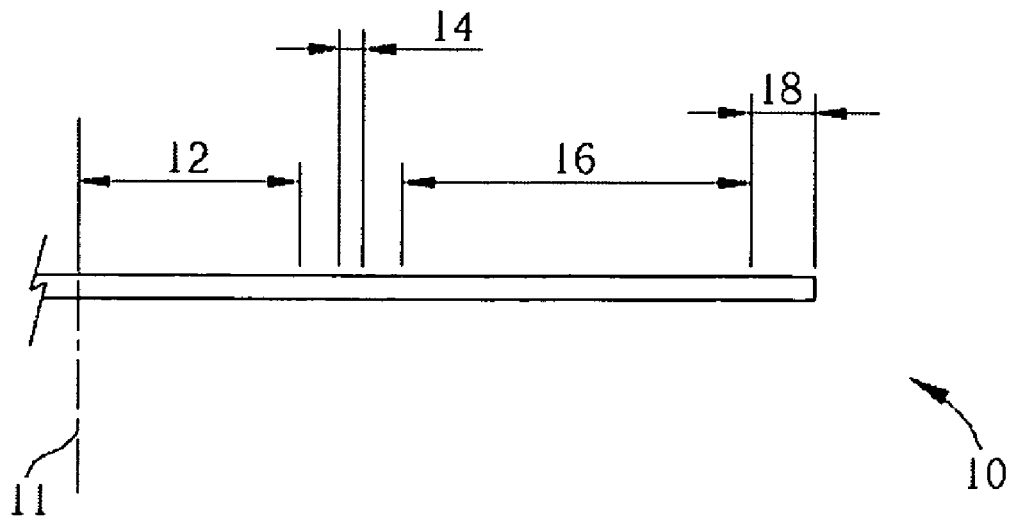
FIG. 1 is a side view of a CD according to the prior art.
Figure 2:
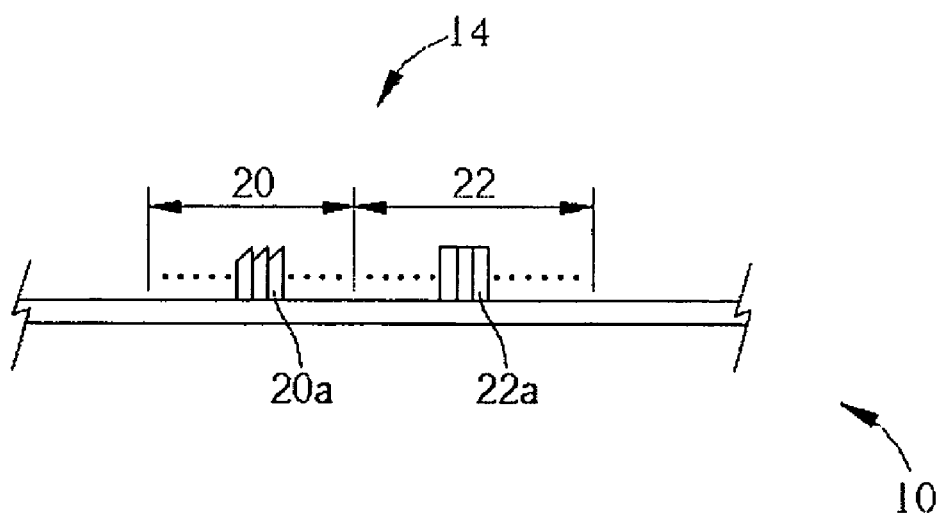
FIG. 2 is a perspective view of a Power Calibration area as shown in FIG. 1.
Figure 3:
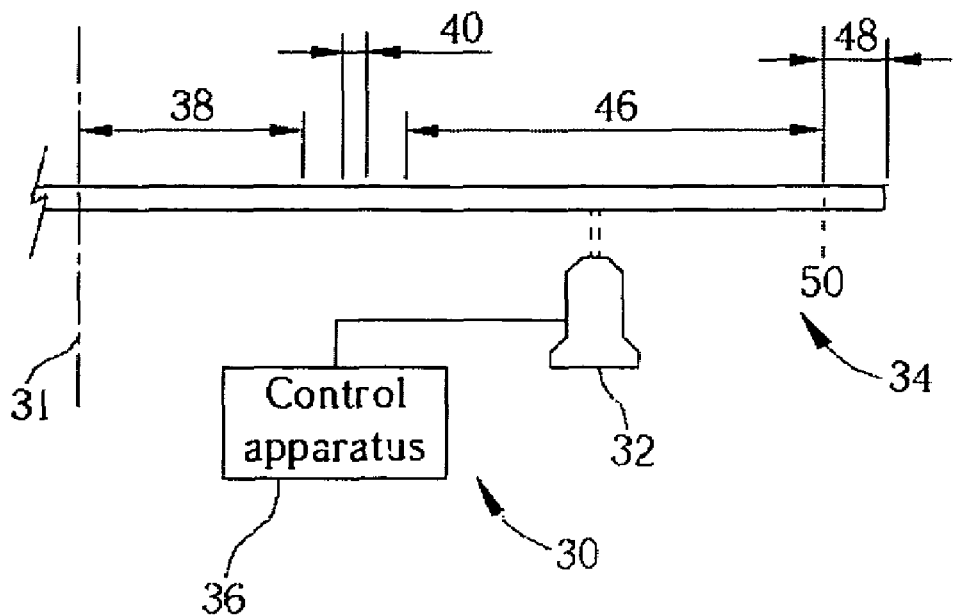
FIG. 3 is a perspective view of a CD-R/RW drive according to the present invention.

Please refer to FIG. 3. FIG. 3 is a perspective view of a CD-R/RW drive 30, according to the present invention. The CD-R/RW drive 30 comprises an access device 32 and a control apparatus 36. The access device 32 reads data from and writes data onto the CD 34. The control apparatus 36 controls the access device 32 to perform optical power calibration and to write data on the CD 34, according to the calibration result.

The CD 34 is a thin disk with symmetry about a centerline 31. The related specifications and functionality of the CD 34 can be found in the Orange Book. From the center toward the outer edge, the CD 34 comprises a central portion 38, an inner power calibration area 40, a data storage area 46, and a last possible lead-out area 48. The central portion 38 comprises a center hole and a clamping area. The inner power calibration area 40 allows for 100 optical power calibrations. The CD 34 further comprises a program memory area (PMA) and a lead-in area (not shown). Both areas are located between the inner power calibration area 40 and the data storage area 46.

According to the standard specification described in the Orange Book, the CD's outer edge should reserve a predetermined length of data track corresponding to at least one and a half minutes (01:30:00) at normal playing speed. This area (the length of data track mentioned above) is the so-called last possible lead-out area 48 of the CD 34. The starting point of the last possible lead-out area 48 is called a last possible start time 50. Typically, right after termination of a data writing action, the CD-R/RW drive 34 will immediately write an ending message into the lead-out area 48.

Figure 4:
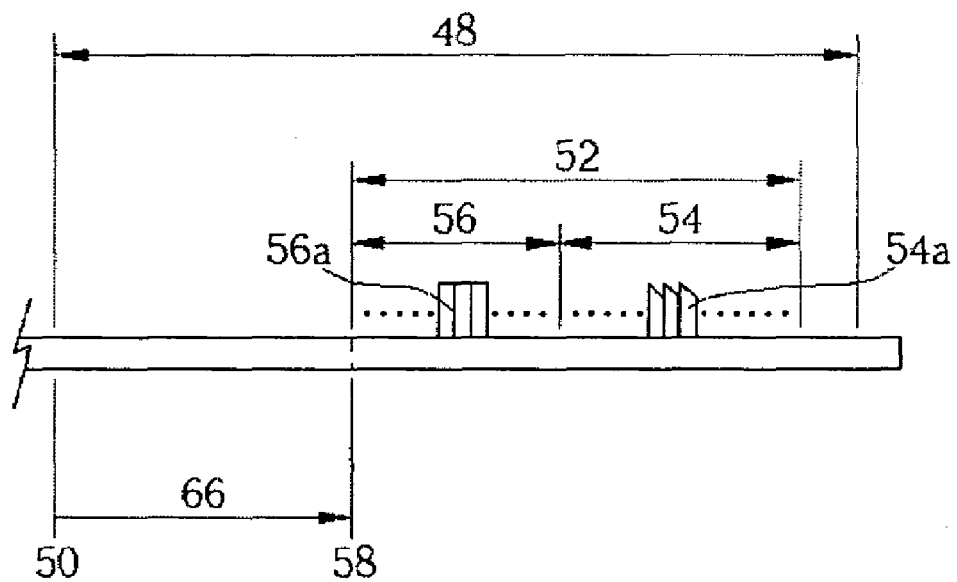
FIG. 4 is a perspective view of an optical power calibration performed in a last possible lead-out area.

Please refer to FIG. 4. FIG. 4 is a perspective view of the optical power calibration performed in the last possible lead-out area 48. A prior art CD-R/RW drive performs optical power calibration in the inner power calibration area 40. However, according to the present invention, an outer power calibration area 52 is defined in the last possible lead-out area 48, so that an optical power calibration can be performed in the outer power calibration area 52.

As shown in FIG. 4, the outer power calibration area 52 comprises a test area 54 for allowing the test data written thereon during the power calibration and a count area 56 for recording a number count of the power calibrations already performed in the outer power calibration area 52. In an implementation example according to the present invention, the test area 54 and the count area 56 are divided into 100 partitions 54a, 56a, respectively.

Typically, 15 frames are necessary for performing each optical power calibration. Therefore, 1500 frames are necessary for performing 100 optical power calibrations. The 1500 frames are corresponding to 20-second period (00:20:00) at the normal playing speed of a CD-R/RW drive. According to the CD specification described in the Orange Book, the length of the last possible lead-out area 48 of a CD should be at least corresponding to one and a half minutes (01:30:00) at the normal playing speed. Moreover, some manufacturers supply CDs where the length of the last possible lead-out area 48 is 01:50:00 which is much longer than the 20 seconds which correspond to 100 optical power calibrations. So, if it is possible to reserve enough length of the last possible lead-out area 48 for recording the ending messages of a CD, then the extra length of the last possible lead-out area 48 may be, used for optical power calibration.

As shown in FIG. 4, according to the present implementation, the predetermined length separation 66 is disposed between the starting point 58 of the outer power calibration area 52 and the last possible start time 50 (the starting point of the last possible lead-out area 48). The predetermined length separation 66 is reserved at least 1 minute (01:00:00), which is long enough for recording the ending message. There is enough length of data track left in the lead-out area 48 for defining an outer power calibration area of at least 20-second (00:20:00) period, which is long enough for performing 100 optical power calibrations.

Figure 5:
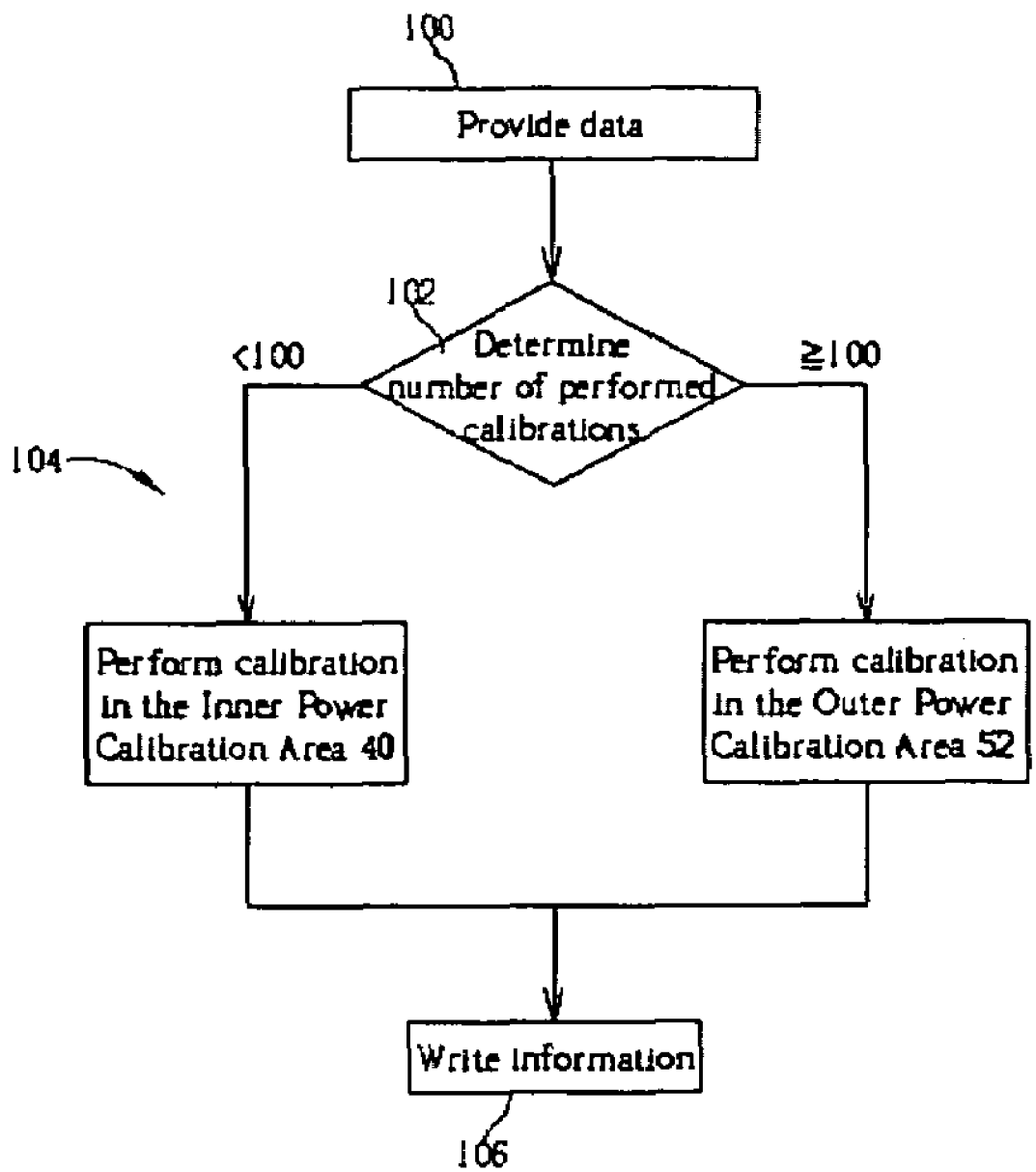
FIG. 5 is a flow chart of the optical power calibration according to the present invention.

Please refer to FIG. 5. FIG. 5 is a flow chart of an optical power calibration according to the present invention. The method of optical power calibration according to the present invention comprises the following steps:

Step 100: provide data to be written;

Step 102: determine the number of optical power calibrations that have been performed on the CD 34;

Step 104: if the number of optical power calibrations is less than 100, control the access device 32 to perform the calibration in the inner power calibration area 40 in FIG. 3, else perform the calibration in the outer power calibration area 52.

Step 106: according to the calibration result, determine the optimized optical power, and then control the access device 32 to write further information to the CD 34.

It should be noted that even though the step order of the calibration procedure mentioned above performs calibration in the inner power calibration area 40 first, then performs calibration in the outer power calibration area 52, this order is still arbitrary. The relative position between the outer power calibration area 52 and the last possible lead-out area 48 is for example only. In fact, a requirement according to the present invention is that the set up of the outer power calibration area 52 should not obstruct the function of the last possible lead-out area 48.

In contrast to the prior art, where optical power calibration is only performed in the inner power calibration area 40, the present invention provides a method of optical power calibration with calibration in the outer edge of a CD. Calibration takes place in both the inner power calibration area 40 and in the outer power calibration area 52, so that more calibrations may be performed on a CD.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method of optical power calibration for calibrating a writing optical power of an optical storage carrier player for writing on a optical storage carrier, the optical storage carrier comprising a central portion, a data storage area located outside the central portion, and a last possible lead-out area located outside the data storage area, the optical storage carrier player comprising an access device for performing a data writing action to write a data onto the data storage area of the optical storage carrier, the method comprising the steps of:

(a) defining an outer power calibration area on the optical storage carrier, the outer power calibration area locating outside the data storage area, a starting point of the outer power calibration area is outer comparing to a starting point of the last possible lead-out area, a predetermined length separation existing between the starting points of the outer power calibration area and the last possible lead-out area;

(b) performing an optical power calibration in the outer power calibration area by the access device to determine an optimized optical power; and (c) writing the data onto the data storage area by the_access device through applying the optimized optical power;

wherein, the predetermined length separation is long enough for writing an ending message after termination of the data writing action.

2. The method of claim 1, wherein the access device selectively choose the outer power calibration area to calibrate the writing optical power according to a specific information recorded in the optical storage carrier.

3. The method of claim 2, wherein the specific information is a number count of an inner power calibration area.

4. The method of 1 claim 1, wherein the predetermined length separation corresponds to at least 1 minute period at a normal playing speed.

5. The method of claim 1, wherein a length of the outer power calibration area is corresponding to at least 20 second period at a normal playing speed.

6. The method of claim 1 wherein the outer power calibration area further comprises a test area for allowing a test data written thereon during the power calibration, and a count area for recording a number count of power calibrations already performed on the outer power calibration area.

7. A method for determining an optical power calibration area on a optical storage carrier, the optical storage carrier comprising a central portion, a data storage area located outside the central portion, and a last possible lead-out area located outside the data storage area, the optical power calibration area being used for calibrating a writing optical power of an optical storage carrier player, the optical storage carrier player comprising an access device for performing a data writing action to write a data onto the data storage area of the optical storage carrier, the method comprising the steps of:

(a) determining a starting point of the last possible lead-out area;

(b) determining a predetermined length separation;

(c) defining a start point of the outer power calibration area; wherein the starting point of the outer power calibration area is outer comparing to the starting point of the last possible lead-out area, the predetermined length separation existing between the starting points of the outer power calibration area and the last possible lead-out area;

wherein, the predetermined length separation is long enough for writing an ending message after termination of the data writing action.

8. The method of claim 7, wherein the access device selectively choose the outer power calibration area to calibrate the writing optical power according to a specific information recorded in the optical storage carrier.

9. The method of claim 7, wherein the specific information is a number count of an inner power calibration area.

10. The method of claim 7 wherein a length of the outer power calibration area is corresponding to at least 20 second period at a normal playing speed.

11. The method of claim 7 wherein the outer power calibration area further comprises a test area for allowing a test data written thereon during the power calibration, and a count area for recording a number count of power calibrations already performed on the outer power calibration area.

\* \* \* \* \*